US006094316A

United States Patent [19]

Pham et al.

[11] Patent Number: 6,094,316

[45] Date of Patent: Jul. 25, 2000

[54] METHOD AND APPARATUS FOR PROVIDING THERMAL ASPERITY COMPENSATION IN A FIXED DELAY TREE SEARCH DETECTOR

[75] Inventors: Bac Pham; Khoa Bui, both of San Jose; Kingston Lin, Morgan Hill, all of Calif.

[73] Assignee: Samsung Electronics Co., Ltd., Suwon, Rep. of Korea

[21] Appl. No.: 09/049,494

[22] Filed: Mar. 27, 1998

[51] Int. Cl.[7] ................................ G11B 5/09; G11B 5/02; G11B 15/12; G11B 5/035

[52] U.S. Cl. ................................ 360/46; 360/25; 360/61; 360/65

[58] Field of Search ................................ 360/25, 53, 65, 360/61, 46

[56] References Cited

U.S. PATENT DOCUMENTS

| | | | |
|---|---|---|---|
| 5,367,409 | 11/1994 | Ottesen et al. . | |
| 5,781,133 | 7/1998 | Tsang | 341/59 |
| 5,822,143 | 10/1998 | Cioke et al. | 360/65 |
| 5,844,920 | 12/1998 | Zook et al. | 371/40.14 |
| 5,862,007 | 1/1999 | Pham et al. | 360/65 |
| 5,898,532 | 4/1999 | Du et al. | 360/46 |
| 5,961,658 | 10/1999 | Reed et al. | 360/53 |

*Primary Examiner*—W. Chris Kim
*Attorney, Agent, or Firm*—Irell & Manella LLP

[57] ABSTRACT

The present invention is a method and apparatus for removing transient DC level shifts caused by thermal asperities. A read signal is generated by a transducer in response to proximate contact between the transducer and magnetic flux fields recorded on a magnetic media surface. The read signal is provided to a continuous time filter and a sampler. During normal operation, the output of the sampler is provided directly to a fixed delay tree search detector. Upon encountering a thermal asperity, the output of the sampler is first provided to a 1-D sampled filter which removes the DC shift caused by the thermal asperity and then to the fixed delay tree search detector, which provides signal recovery. A multiplexer provides selection of the output signal from between sampler and the 1-D sample filter.

20 Claims, 7 Drawing Sheets r (t)
300
302
1
0.5
0
-0.5
-1
0
500
1000
1500 r (t)SAM (analog)
304
306
1
0.5
0
-0.5
-1
200
400
600 r TA(t)
400
402
403
2
1
0
-1
0
500
1000
1500 r TA(t)SAM
404
405
406
2
1
0
-1
200
400
600

METHOD AND APPARATUS FOR PROVIDING THERMAL ASPERITY COMPENSATION IN A FIXED DELAY TREE SEARCH DETECTOR

BACKGROUND OF THE INVENTION

1. Field of the Invention

The present invention relates in general to direct access storage devices and more particularly, to a method and apparatus for providing compensation for shifts in recording levels in a direct access storage device which utilizes a fixed-delay tree search detector, where such shifts are due to changes in magneto-resistive (MR) head temperatures and contact of the MR head with asperities.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and to move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

There has been developed a dual element transducer which includes a single write element and a separate read element that is constructed from a magneto-resistive material. Such dual element transducers are commonly referred to as magneto-resistive (MR) heads. Due to its sensitivity, an MR head is particularly susceptible to errors caused by thermal asperities, which are recording signal anomalies caused by contact between an MR head and asperities on the media surface. Asperities may be caused by manufacturing defects, dust or flecks of metal oxide on recording media surfaces. Thermal asperity related errors may be caused by rapidly rising MR head temperatures due to momentary contact with an asperity. A rise in temperature may change head resistance, causing a corresponding transient in output signal voltage. Since MR resistance varies with variation in the amplitude of the magnetic field, transients in MR head voltage correlate directly to errors. When severe, thermal asperity-induced errors may be unrecoverable because the number of resulting errors may exceed the syndrome or the capability of error correcting codes (ECC) used in read processing circuits.

One particularly troublesome problem with thermal asperities, which make them difficult to detect and correct, is their timing. Thermal related transients in MR head outputs may occur with rise times measured in nanoseconds. Fast rise times may make thermal asperities difficult to detect in a sufficient amount of time to invoke corrective measures. Moreover, with durations of several microseconds, thermal asperities may cause continuous error bursts before dissipating. In addition, the amplitude of transients caused by thermal asperities may be greater than twice the peak amplitude of the MR head read signal.

One approach to this problem is described by Galbraith et al. in "Magneto-Resistive Head Thermal Asperity Digital Compensation", which discloses an analog to digital converter expanded headroom technique and a timing and gain correction-hold technique. This approach, however, has the disadvantage of reduced signal-to-noise ratio when operated in an expanded headroom mode. Moreover, lack of control of the thermal asperities during the hold periods when timing and control loop operation is suspended may cause a complete loss of read data synchronization and gain synchronization.

A second approach to this problem is disclosed in U.S. Pat. No. 5,367,409 to Ottensen, which discloses even harmonic distortion compensation for digital data detection. The Ottensen technique requires the use of an analog-to-digital converter (ADC) for providing a sampled readback signal and an adder for providing a compensated output signal. The compensated output signal is then applied to the digital channel. The Ottensen technique, is however, complex and the hardware costs associated with the ADC and the adder make the practical implementation of the technique difficult.

U.S. patent application Ser. No. 08/634,189, entitled "Thermal Asperity and Baseline Shift Compensation" which was assigned to the assignee of the present invention, describes a method and apparatus for removing transient DC level shifts caused by thermal asperities in a direct access storage device. This application describes the removal of such transient DC level shifts in a direct access storage device which utilizes a PR4 Viterbi Detector.

As the density at which data is written on a magnetic recording channel increases relative to the width of the isolated transition response of the channel, intersymbol interference (ISI) imposes a limit on the error-rate that can be achieved using standard bit-by-bit detection methods like peak detection. There has been developed a Fixed-Delay Tree Search (FDTS) Detector, which when used in conjunction with an appropriate encoding and/or decoding scheme, would provide a read signal with an improvement of several decibels over conventional PR4 or PR5 Viterbi detectors. However, to date, there has yet been developed a method for providing compensation for shifts in recording levels in a direct access storage device which utilizes a FDTS detector, where such shifts are due to changes in magneto-resistive (MR) head temperatures and due to contact of the MR head with asperities.

Accordingly, there is a need in the technology for a simple, effective and elegant method and apparatus for providing compensation for shifts in recording levels in a direct access storage device which utilizes a FDTS detector, where such shifts are due to changes in magneto-resistive (MR) head temperatures and due to contact of the MR head with asperities.

BRIEF SUMMARY OF THE INVENTION

The present invention is a method and apparatus for removing transient DC level shifts caused by thermal asperities. A read signal is generated by a transducer in response to proximate contact between the transducer and magnetic flux fields recorded on a magnetic media surface. The read signal is provided to a continuous time filter and a sampler. During normal operation, the output of the sampler is provided directly to a fixed delay tree search detector. Upon encountering a thermal asperity, the output of the sampler is first provided to a 1-D sampled filter which removes the DC shift caused by the thermal asperity and then to the fixed delay tree search detector, which provides signal recovery. A multiplexer provides selection of the output signal from between sampler and the 1-D sample filter.

DETAILED DESCRIPTION OF THE INVENTION

The present invention removes transient DC level shifts in a read signal that are caused by thermal asperities in a direct access storage device which utilizes a fixed delay tree search detector. A read signal is generated by a transducer in response to proximate contact between the transducer and magnetic flux fields recorded upon a magnetic media surface. The read signal is provided to a continuous time filter and a sampler. During normal operation, the output of the sampler is provided directly to a fixed-delay tree search (FDTS) detector. Upon encountering a thermal asperity, the output of the sampler is first provided to a 1-D sampled filter, which differentiates the read signal and removes the DC shift caused by the thermal asperity, and then to a the FDTS detector, which provides signal recovery. A multiplexer provides selection of the output signal from between the sampler and the 1-D sample filter.

Figure 1:
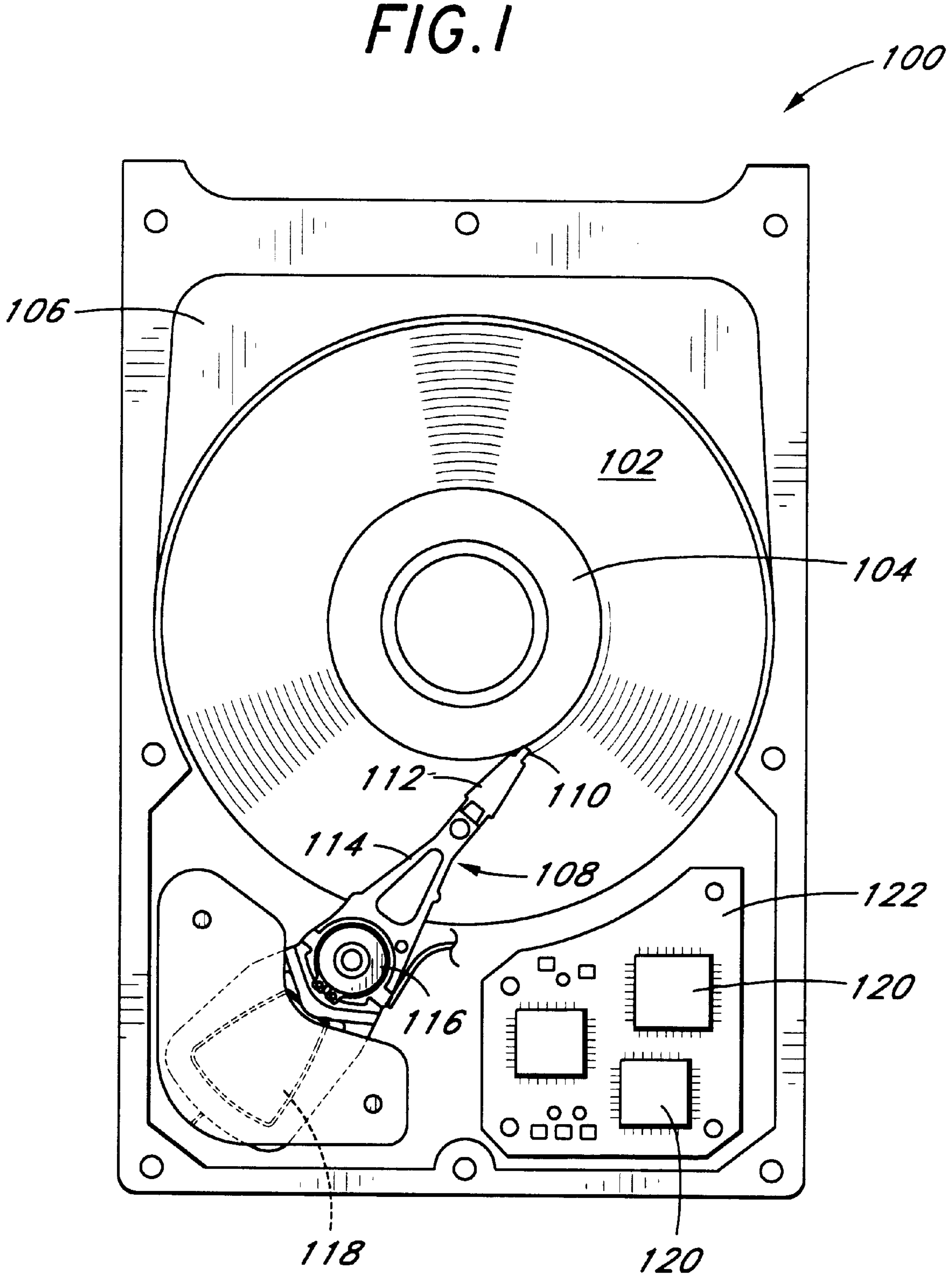
FIG. 1 illustrates a hard disk drive which utilizes the method of the present invention.

Referring to the drawings more particularly by reference numbers, FIG. 1 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil motor 118 which moves the heads 110 relative to the disk 102. There is typically a single head for each disk surface. The spin motor 104, voice coil motor 118 and the heads 110 are coupled to a number of electronic circuits 120 mounted to a printed circuit board 122. In the following discussion, only one head 110 is referenced. The electronic circuits 120 typically include a read channel chip, a microprocessor-based controller and a random access memory (RAM) device.

Figure 2A:
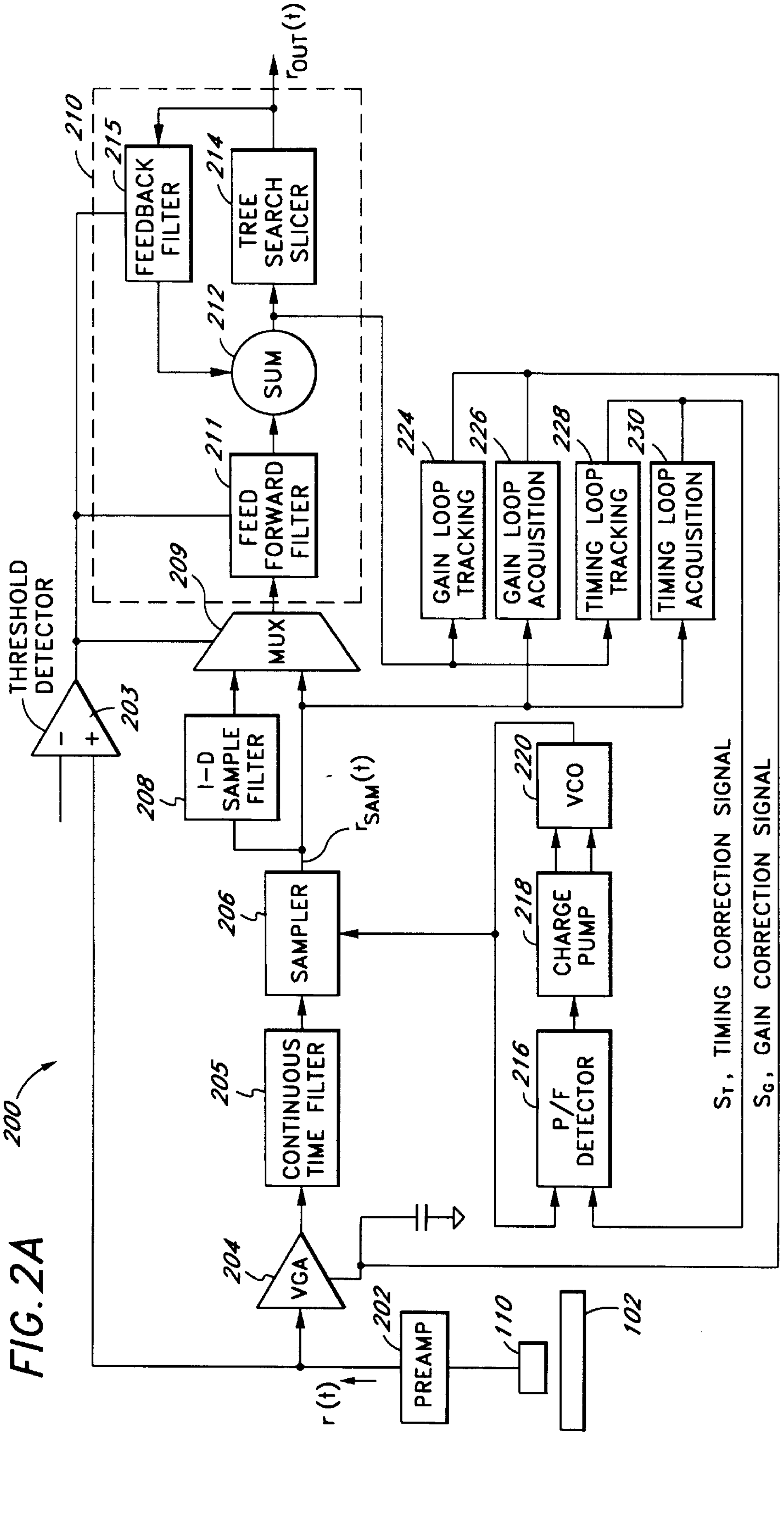
FIG. 2A is a block diagram of an integrated circuit read channel in accordance with the present invention.

FIG. 2A is a block diagram of one of the electronic circuits 120 of FIG. 1, which includes the thermal asperity compensation circuit 200 of the present invention. The thermal asperity compensation circuit 200 includes a preamplifier 202 which is coupled to one of the magnetic heads 110 that senses the magnetic field of a magnetic disk 102. When reading data located on the disk 102, the head 110 generates a read signal that corresponds to the magnetic field of the disk 102. The read signal is first amplified by the preamplifier 202, and then provided to a variable gain amplifier (VGA) 204. The amplified read signal is also provided as one input to the noninverting terminal of a threshold detector 203. The inverting terminal of the threshold detector 203 is coupled to a threshold signal which is representative of a typical level of a thermal asperity. The output of the threshold detector 203 is used to control a multiplexor 209, a feedforward filter 211 and a feedback filter 215, as described in detail in the following sections.

The VGA 204 amplifies the read signal that is then provided to a continuous time filter 205. The output of the VGA 204 is a function of a gain correction signal $S_G$ of a gain tracking loop 224 and a gain acquisition loop 226. In one embodiment, the continuous time filter 206 is a 7-pole, 2-zero equi-ripple filter for standard signal conditioning, as is known in the art. In particular, the continuous time filter 205 limits the received signal's bandwidth to prevent aliasing. As such, the continuous time filter 205 is a low pass filter with a cut-off frequency that is less than half the sampling rate of Sampler 206. Continuous time filter 205 may also provide some equalization of the analog signal. The output of the continuous time filter 205 is provided to a Sampling circuit or Sampler 206, which samples the amplified read signal to provide a sequence of analog samples $r_{SAM}$ of the amplified read signal.

Samples $r_{SAM}$ of the amplified read signal are also provided to a Gain Loop Acquisition circuit 226 and a Timing Loop Acquisition circuit 230. The output of the summing circuit 212 is also provided to a Gain Loop Tracking circuit 224 and a Timing Loop Tracking circuit 230. A gain correction signal $S_G$ generated by the Gain Loop Tracking circuit 224 and the Gain Loop Acquisition circuit 226, is provided as a variable gain set point for the VGA 204. The timing correction signal $S_T$ generated by the Timing Loop Tracking circuit 228 and the Timing Loop Acquisition circuit 230, which provides timing corrections to the sampling rate, is provided to a phase/frequency detector 216. Phase and frequency errors are provided to a Charge Pump 218 which accumulates a charge proportional to the timing correction signal $S_T$. In response, the Charge Pump 218 outputs the accumulated charge due to timing error as a voltage to a Voltage Controlled Oscillator (VCO) 220. The VCO 220 generates a signal with a corrected frequency which is used to control the sampling frequency of the Sampler 206, and which is simultaneously fed back to the phase/frequency detector 216 for comparison with the timing correction signal $S_T$ generated by the Timing Loop Tracking circuit 228.

During normal operation, the output of the Sampler 206 is directly provided to a FDTS detector 210 via multiplexor 209. The feedforward filter 211 and the feedback filter 215 in the FDTS detector 210 will also utilize a first set of predetermined parameters (such as taps) for normal operation. However, when a thermal asperity is detected by threshold detector 203, the threshold detector 203 generates a signal to direct the multiplexor 209 to multiplex the samples $r_{TA}(t)_{SAM}$ through a 1-D Sample filter 208, to the FDTS detector 210. The 1-D Sample Filter 208 first differentiates the sample stream and then removes the level shift from the resulting sample stream. In one embodiment, the sample filter 232 is a discrete time filter having a transfer function of T(D)=1-D, where D is a delay factor. Depending upon system partial response parameters, D may be vary from $D^2$ to $D^N$, where N is an integer. When a thermal asperity is encountered, the multiplexor 210 also provides a signal to the feedforward filter 211 and the feedback filter 215 in the FDTS detector 210, to utilize a second set of predetermined parameters (such as taps) for processing the read signal. Samples from the FDTS detector 210 are then generated as output signal $r_{OUT}(t)$.

Figure 2B:
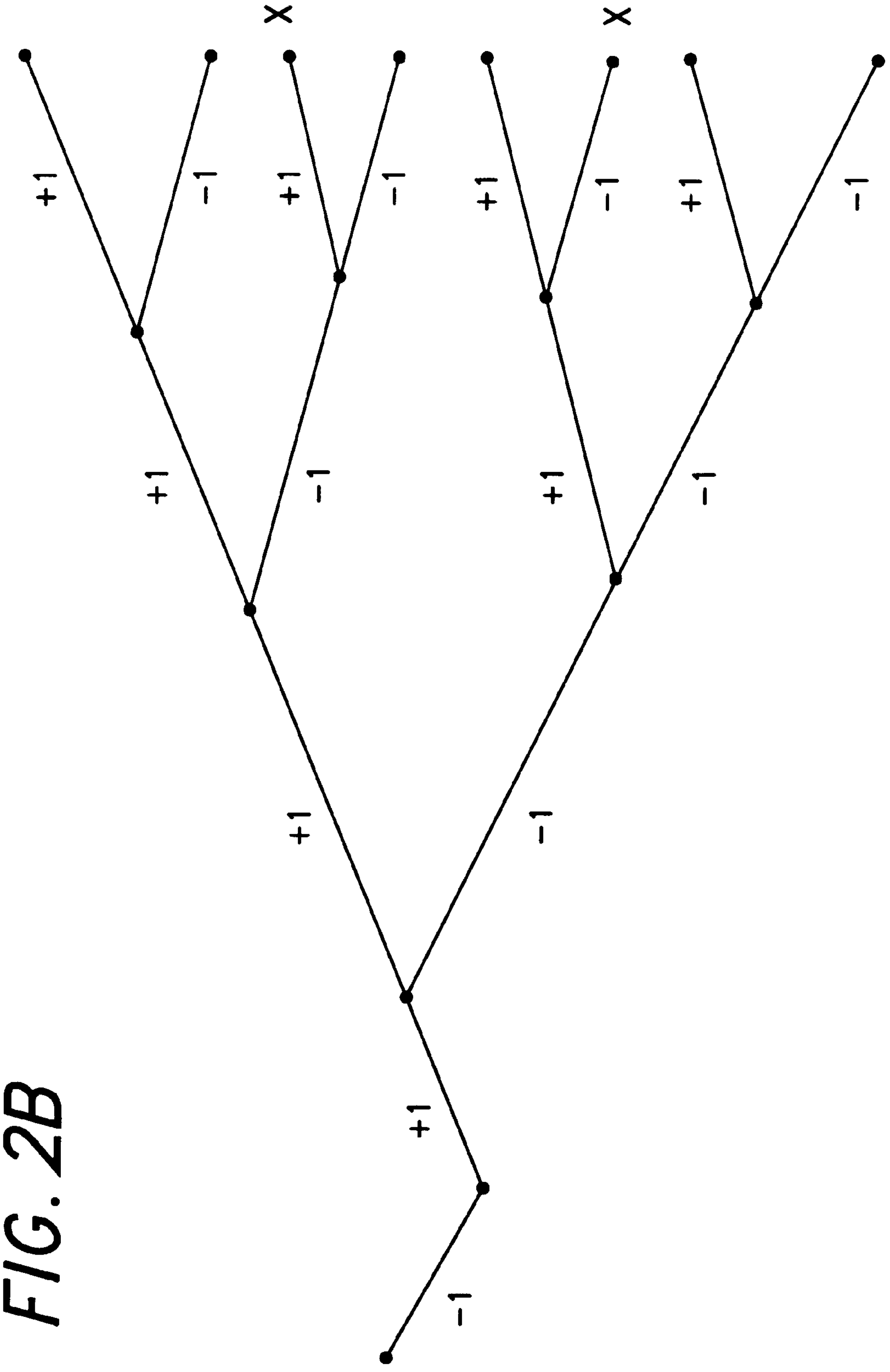
FIG. 2B illustrates a tree structure for the fixed delay tree search detector 210 of FIG. 2A.

The FDTS detector 210 provides a delay-constrained form of maximum-likelihood estimate of the data stored on the disk 102 (FIG. 1) that is read by read head 110. In particular, trailing intersymbol interference (ISI) beyond the depth of the tree is subtracted from the FDTS detector's 210 output using a standard decision feedback filter 215. FIG. 2B illustrates one embodiment of a tree structure for the fixed delay tree search detector 210. Within the tree a transition metric associated with each branch is computed. The transition or branch metric is the square of the difference between the observed signal and the ideal "noiseless" signal, which is $y(n)=1.0\times d(n)+b_1\times d(n-1)+b_2\times d(n-2)$ for a tree of depth 3, which corresponds to a delay of 2, (i.e., where τ=2), d(n) is the assumed decision at time n and $b_1$ and $b_2$ are normally determined by adaptation. The path metric of the FDTS detector 210 is the sum of the branch metrics along a particular path. If the smallest path metric is in the upper half of the tree, then a+1 is chosen for the symbol τ samples in the past, and the path metrics from the lower half of the tree are discarded. The whole process moves forward to the next symbol period with each of the selected terminal nodes extended to complete the tree. This requires computing the branch metrics for the added branches and to add to the kept path metrics.

Figure 3A:
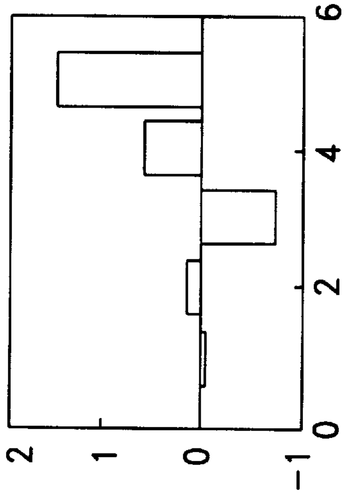
FIG. 3A illustrates the parameters of the feedforward filter 211 of FIG. 2A, used in processing a normal read signal r(t).
Figure 3B:
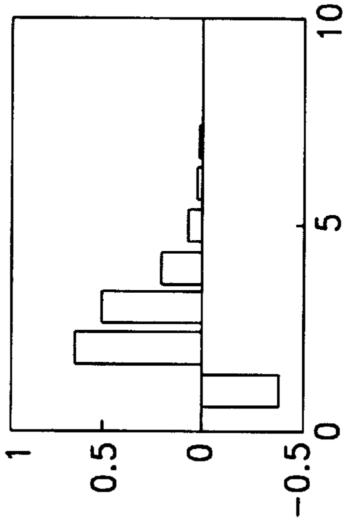
FIG. 3B illustrates the parameters of the feedback filter 215 of FIG. 2A, used in processing a normal read signal r(t).
Figure 4A:
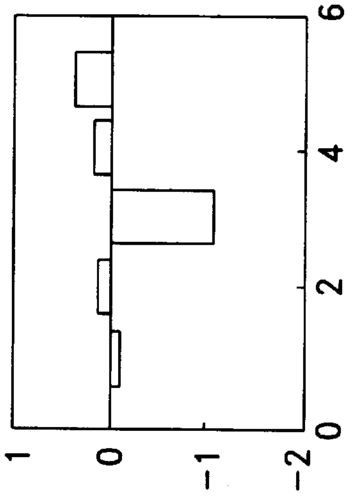
FIG. 4A illustrates the parameters of the feedforward filter 211 of FIG. 2A, used in processing a read signal $r_{TA}(t)$ during a thermal asperity disturbance.
Figure 4B:
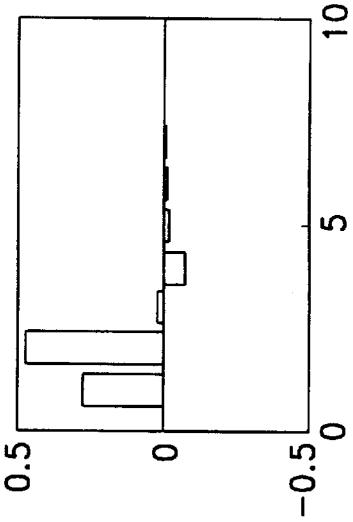
FIG. 4B illustrates the parameters of the feedback filter 215 of FIG. 2A, used in processing a read signal $r_{TA}(t)$ during a thermal asperity disturbance.

As shown in FIG. 2A, the FDTS detector 210 comprises a feedforward filter 211, a summing circuit 212, a tree search slicer 214 and a feedback filter 215. The feedforward filter 211 equalizes the read channel of the FDTS detector 210 to a certain target. The feedback filter 215 will cancel the "tail" or unselected path metrics of the target response. The tree search slicer 214 conducts the depth-limited exhaustive tree search process. For example, during normal operation, the taps for the feedforward and the feedback filters 211 and 215, are τ=1 and $b_1$=0.2, as shown in FIGS. 3A and 3B respectively. When a thermal asperity is present, the multiplexer 209 will issue a signal to the feedforward filter 211 and the feedback filter 215 to change these parameters, for example, to τ=1 and $b_1$=0.15. FIGS. 4A and 4B illustrate one example of the parameters of the feedforward filter 211 and the feedback filter 215 respectively, when a thermal asperity is encountered. As is understood by one skilled in the art, other appropriate sets of parameters may be selected for normal operation and for operation when a thermal asperity is encountered. In one embodiment, an optimal mean-squared error analysis, such as a least mean-squared error analysis, is implemented to select, for example, the parameters τ and $b_1$ of the feedforward filter 211 and the feedback filter 215.

Operation of the compensation circuit of the present invention will be discussed with reference to FIGS. 5A–C and 6A–C.

Figures 5A, 5B, 6A, 6B:
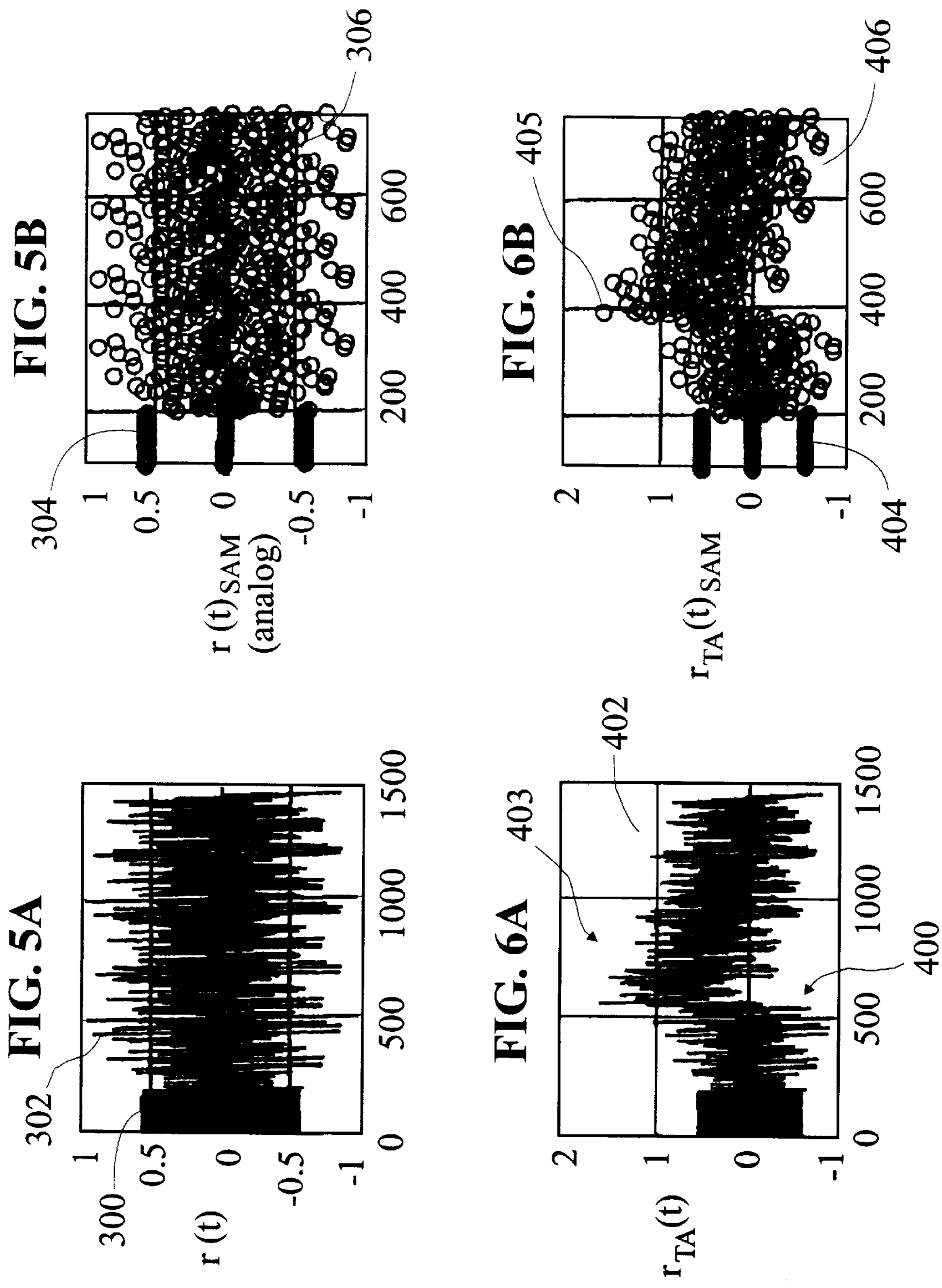
FIG. 5A is graph illustrating a normal read signal r(t) that is detected by the head 110 and amplified by the preamplifier 202 of FIG. 1.
FIG. 5B is a graph illustrating the signal $r(t)_{SAM}$ upon amplification, filtering and sampling of the read signal r(t) of FIG. 5A.
FIG. 6A is graph illustrating a read signal $r_{TA}(t)$ during a thermal asperity disturbance as detected by the head 110 and amplified by the preamplifier 202 of FIG. 1.
FIG. 6B is a graph illustrating the signal $r_{TA}(t)_{SAM}$ upon amplification, filtering and sampling of the thermal asperity-disturbed read signal $r_{TA}(t)$ of FIG. 6A.
Figure 5C:
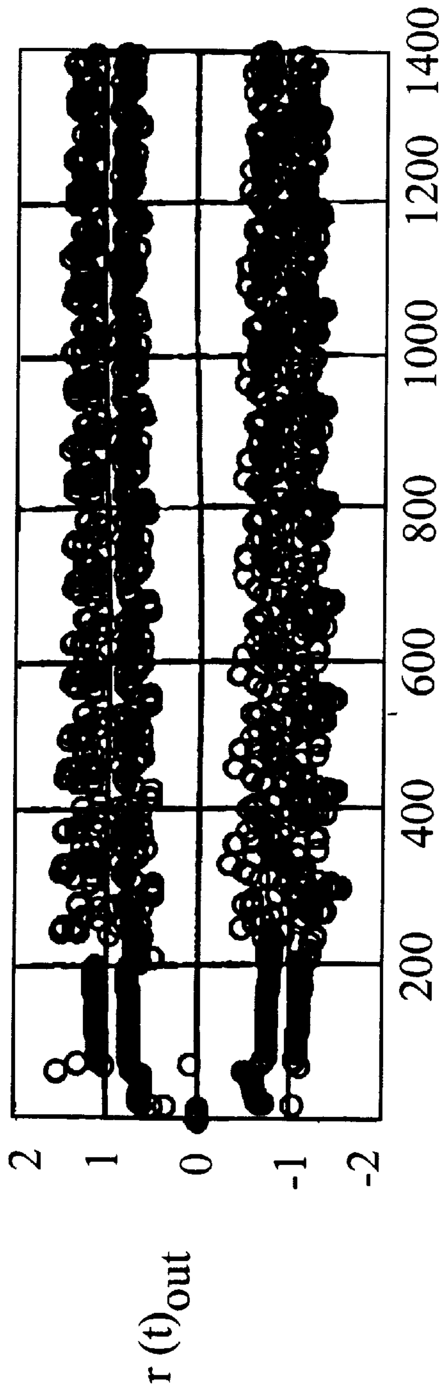
FIG. 5C is a graph illustrating the output signal $r(t)_{OUT}$ upon filtering of the signal $r(t)_{SAM}$ of FIG. 5B by feedforward filter 211, feedback filter 215 and detection by the tree search slicer 214 of FIG. 2A.

FIG. 5A is graph illustrating a normal read signal r(t) that is detected by the head 110 and amplified by the preamplifier 202 of FIG. 1. Signal portion 300 represents the preamble and sync portion of the read signal r(t) and signal portion 302 represents random data. Signal portions 300 and 302 are representative of a normal read signal without thermal asperity disturbance. FIG. 5B is a graph illustrating the signal $r(t)_{SAM}$ upon amplification, filtering and sampling of the read signal r(t) of FIG. 5A. Signal portion 304 corresponds to the output of the continuous time filter 206 (see FIG. 2) when signal portion 300 of FIG. 5A is input. Signal portion 306 corresponds to the output of the continuous time filter 206 when signal 302 of FIG. 5A is input. FIG. 5C is a graph illustrating the signal $r(t)_{OUT}$ upon recovery of the signal $r(t)_{SAM}$ by the FDTS detector 210 of FIG. 2A.

FIG. 6A is graph illustrating a read signal $r_{TA}(t)$ during a thermal asperity disturbance as detected by the head 110 and amplified by the preamplifier 202 of FIG. 1. Signal portion 400 represents preamble, sync and a portion of data that is not affected by the thermal asperity. Signal portion 402 represents normal random customer data. Signal portion 403 represents the read signal upon encountering a thermal asperity disturbance. As shown, the level of the signal $r_{TA}(t)$ rises sharply when a thermal asperity is encountered, in contrast to normal signal levels shown in FIG. 6A.

FIG. 6B is a graph illustrating the signal $r_{TA}(t)_{SAM}$ upon amplification, filtering and sampling of the thermal asperity-disturbed read signal $r_{TA}(t)$ of FIG. 6A. Signal portion 404 represents the output of the continuous time filter 206 corresponding to the preamble and sync 400 of FIG. 6A. Signal section 406 represents the continuous time filter 206 output during a thermal asperity disturbance. Note again that the level of the signal $r_{TA}(t)_{SAM}$ rises sharply when a thermal asperity is encountered, in contrast to normal signal levels shown in FIG. 5B.

Figure 6C:
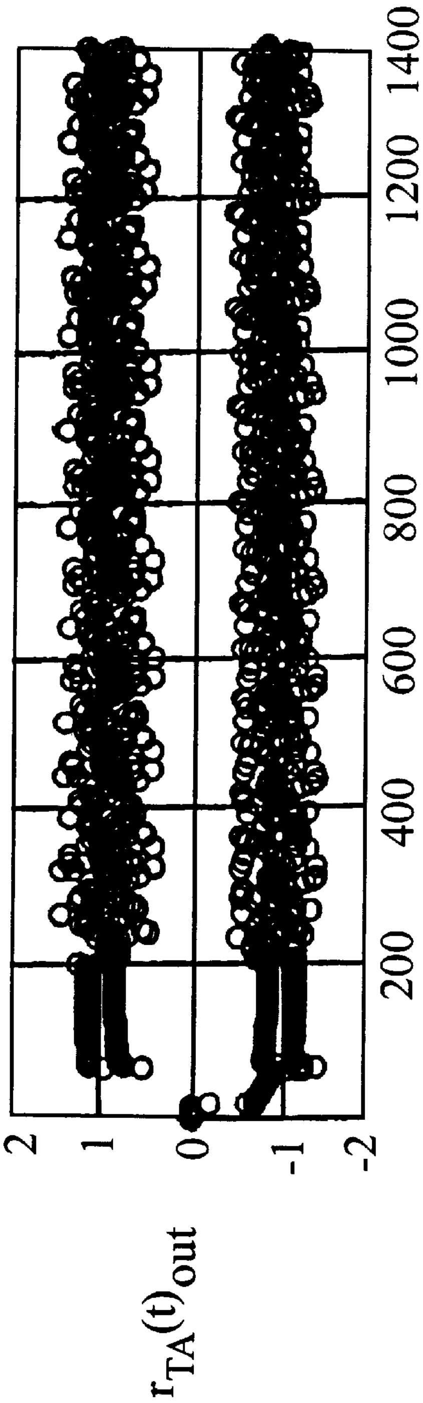
FIG. 6C is a graph illustrating the output signal $r_{TA}(t)_{OUT}$ upon filtering of the signal $r_{TA}(t)_{SAM}$ of FIG. 6B by feedforward filter 211, feedback filter 215 and detection by the tree search slicer 214 of FIG. 2A.

FIG. 6C is a graph illustrating the signal $r_{TA}(t)_{OUT}$ upon recovery of the signal $r_{TA}(t)_{SAM}$ of FIG. 4B by the FTDS detector 210. Due to the 1-D operation and the proper choice of parameters for the feedforward filter 209 and the feedback filter 215, the signal $r_{TA}(t)_{SAM}$ is almost identical to the signal $r(t)_{SAM}$ obtained when no thermal asperity is encountered.

Figure 7A:
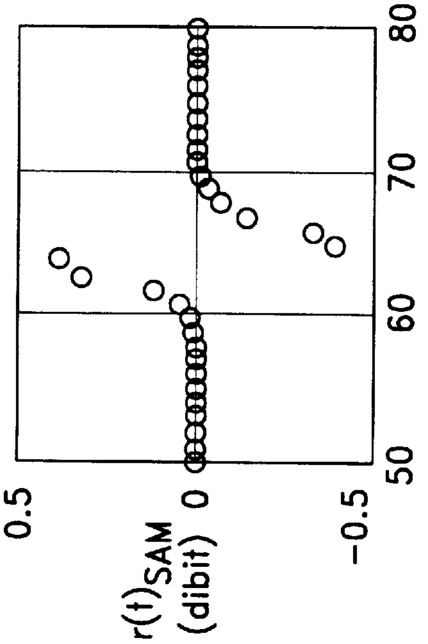
FIG. 7A illustrates a dibit sample taken during normal operation at the output of the sampler 208 of FIG. 2A.
Figure 7B:
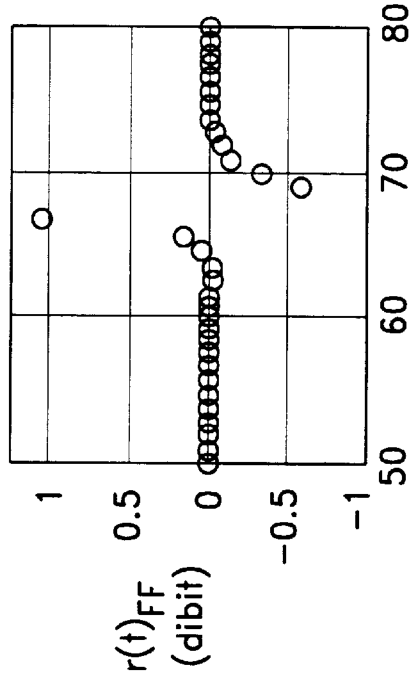
FIG. 7B illustrates an equalized dibit response taken during normal operation at the output of the feedforward filter 211 of FIG. 2A.
Figure 8A:
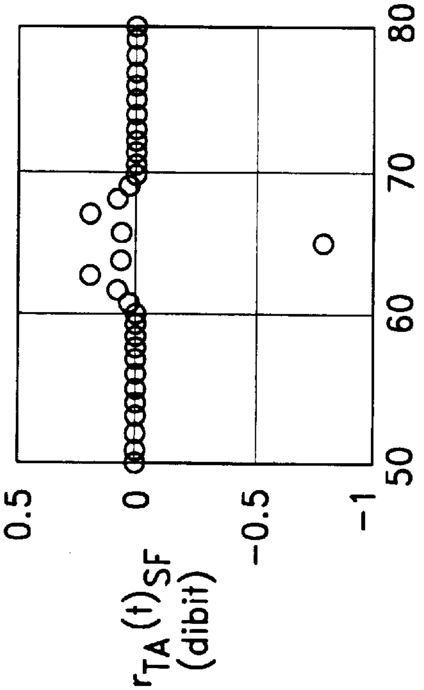
FIG. 8A illustrates a dibit sample during a thermal asperity disturbance taken at the output of the sampler 208 of FIG. 2A.
Figure 8B:
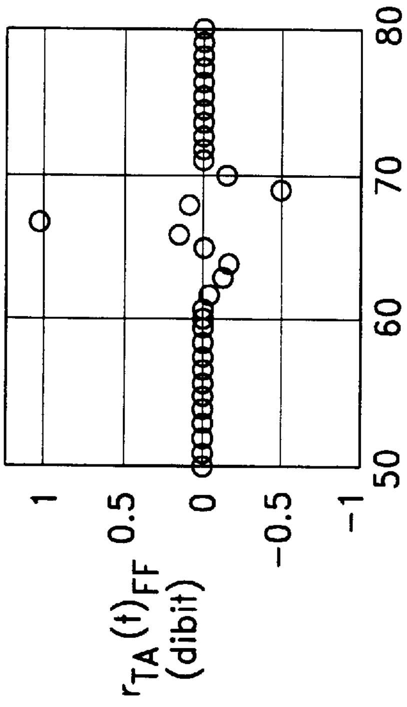
FIG. 8B illustrates an equalized dibit response during a thermal asperity disturbance taken at the output of the feedforward filter 211, upon filtering by the (1-D) sample filter 208 of FIG. 2A.

FIG. 7A illustrates a dibit sample taken during normal operation at the output of the sampler 208. FIG. 7B illustrates an equalized dibit response taken during normal operation at the output of the feedforward filter 211. FIG. 8A illustrates a dibit sample taken during a thermal asperity disturbance taken at the output of the sampler 208. FIG. 8B illustrates an equalized dibit response taken during a thermal asperity disturbance taken at the output of the feedforward filter 211. As shown by in FIG. 8B, the system response of the thermal asperity compensation circuit 200 upon encountering a thermal asperity, is very similar to the transfer function of the circuit 200 during normal operation, as shown in FIG. 7B. Due to the differentiation operation of the 1-D Sample Filter 208 and the proper choice of parameters for the feedforward filter 211 and feedback filter 215, the circuit 200 performs as well when it encounters a thermal asperity, as when it operates normally.

The present invention thus provides a simple, effective and elegant method and apparatus for providing compensation for shifts in recording levels due to changes in magnetoresistive (MR) head temperatures and contact of the MR head with asperities. The implementation of the present invention provides several advantages. First, conventional decoding of the read signal through the use of a FDTS detector 210 is maintained so that the benefit of existing timing and gain control techniques are retained. Second, the present invention can correct for all frequency spectrums of an input signal. Third, the error burst length upon correction is minimal if the read signal is not saturated. Fourth, the implementation of the present invention is simple: only a 1-D sample filter and a multiplexor are required for coupling to an existing read channel circuit. Fifth, the corresponding change in firmware for implementing the present invention is minimal.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A circuit for processing a read signal in a storage device, comprising:

a sampling circuit to receive a read signal generated by a transducer in response to proximate contact between the transducer and magnetic flux fields recorded upon a magnetic media surface;

said sampling circuit, to convert the read signal into a sample stream;

a sample filter coupled to the sampling circuit that differentiates and filters a level shift in the sample stream due to a thermal asperity located on the magnetic media surface to provide a filtered sample stream in which the level shift is removed;

a multiplexor coupled to said sampling circuit and said sample filter; and a fixed delay tree search detector coupled to said multiplexor, said detector having a first set of filter parameters that are selected for use during normal operation, and a second set of filter parameters that are selected for use during said contact;

wherein said multiplexor provides the output of the sampling circuit directly to said detector during normal operation and provides the output of the sampling circuit to said detector via said sample filter during said contact.

2. The circuit as recited in claim 1, wherein said fixed delay tree search detector comprises:

a first filter coupled to said multiplexor;

a summing circuit coupled to said first filter;

a tree search circuit coupled to said summing circuit; and a second filter coupled to said tree search circuit and said summing circuit.

3. The circuit as recited in claim 2, wherein the first filter is a feedforward filter.

4. The circuit as recited in claim 2, wherein the second filter is a feedback filter.

5. The circuit as recited in claim 1, wherein the first set of filter parameters are $\tau=1$ and b1=0.2.

6. The circuit as recited in claim 1, wherein the second set of filter parameters are $\tau=1$ and b1=0.15.

7. The circuit as recited in claim 1, wherein the first set and the second set of filter parameters are each determined using a least mean-squared error analysis.

8. The circuit as recited in claim 1, wherein the sample filter has a transfer function of 1-D, where D is an integer.

9. The circuit as recited in claim 1, further comprising a smoothing filter coupled to said sampling circuit, said smoothing filter to filter said read signal.

10. The circuit as recited in claim 1, wherein the sampling circuit includes an analog-to-digital converter.

11. A method for processing a read signal, comprising:

(a) receiving a read signal generated by a transducer in response to proximate contact between the transducer and magnetic flux fields recorded upon a magnetic media surface;

(b) converting the read signal into a sample stream;

(c) filtering the sample stream using a first set of filter parameters selected for use during normal operation;

(d) otherwise differentiating a level shift in the read signal due to a thermal asperity located on the magnetic media surface to provide a differentiated sample stream; and (e) filtering the differentiated sample stream using a second set of filter parameters, to provide a filtered sample stream in which the level shift is removed;

(f) providing either one of the filtered sample stream or the differentiated, filtered sample stream as an output.

12. The method of claim 11, wherein (e) is performed during noncontact.

13. The method of claim 11, wherein filtering in (c) and (e) each comprises filtering by a fixed delay tree search detector.

14. The method as recited in claim 11, wherein filtering in (c) and (e) comprises:

filtering, by a first filter;

summing an output of said first filter with an output of a second filter to provide a summed output;

performing a tree search process on the summed output to provide a resulting signal;

providing the resulting signal as an output signal and as an input to the second filter, said second filter filtering the resulting signal and providing a feedback signal as an output.

15. The method as recited in claim 14, wherein filtering by the first filter comprises feedforward filtering.

16. The method as recited in claim 14, wherein filtering by the second filter feedback filtering.

17. The method as recited in claim 11, further comprising determining said first set of filter parameters by using a least mean-squared error analysis.

18. The method as recited in claim 12, further comprising determining said second set of filter parameters by using a least mean-squared error analysis.

19. The method of claim 11, wherein the differentiating is performed by filtering, with a sample filter having a transfer function of 1-D, where D is an integer.

20. The method of claim 11, further comprising smoothing of the read signal prior to converting the read signal.

* * * * *